United States Patent [19]

Komurasaki et al.

[11] Patent Number: 5,144,837
[45] Date of Patent: Sep. 8, 1992

[54] ACCELERATION DETECTOR

[75] Inventors: Satosi Komurasaki; Shoiti Katoh, both of Himeji; Tomohumi Kinugasa, Kako, all of Japan

[73] Assignee: Mitsubishi Denki K.K., Tokyo, Japan

[21] Appl. No.: 493,542

[22] Filed: Mar. 14, 1990

[30] Foreign Application Priority Data

Mar. 15, 1989 [JP] Japan .................................. 1-28511
Mar. 29, 1989 [JP] Japan .................................. 1-34843

[51] Int. Cl.$^5$ .............................................. G01P 15/09
[52] U.S. Cl. .................................. 73/517 R; 73/35; 411/405
[58] Field of Search ................ 73/35, 654, 517 R; 310/329; 411/405

[56] References Cited

U.S. PATENT DOCUMENTS

| | | |
|---|---|---|
| 3,339,090 | 8/1967 | Jaffe et al. .................... 310/329 |
| 4,006,660 | 2/1977 | Yamamoto et al. ................. 411/405 |
| 4,399,705 | 8/1983 | Weiger et al. .................... 73/654 |
| 4,586,377 | 5/1986 | Schmid ........................... 310/329 |
| 4,840,158 | 6/1989 | Komurasaki . |

Primary Examiner—John E. Chapman
Attorney, Agent, or Firm—Sughrue, Mion, Zinn Macpeak & Seas

[57] ABSTRACT

An acceleration detector including an acceleration transducer assembly including a piezoelectric element, an output terminal and an inertial weight. The transducer assembly is secured on a threaded bushing by a substantially ring-shaped, thread-engaging stop nut thread-engaging to the threaded bushing. The stop nut has an internal thread in its inner circumferential surface and a pair of axially extending engagement grooves formed in its outer circumferential surface at equal intervals for receiving a tool for rotating the stop nut about the bushing. The output terminal may have a ring-shaped portion, a connecting tab radially outwardly extending from the ring-shaped portion for an external connection, and a transition fillet provided at a transition area between the ring-shaped portion and the tab for moderating the concentration of stress on the transition area.

7 Claims, 6 Drawing Sheets

F I G. 15
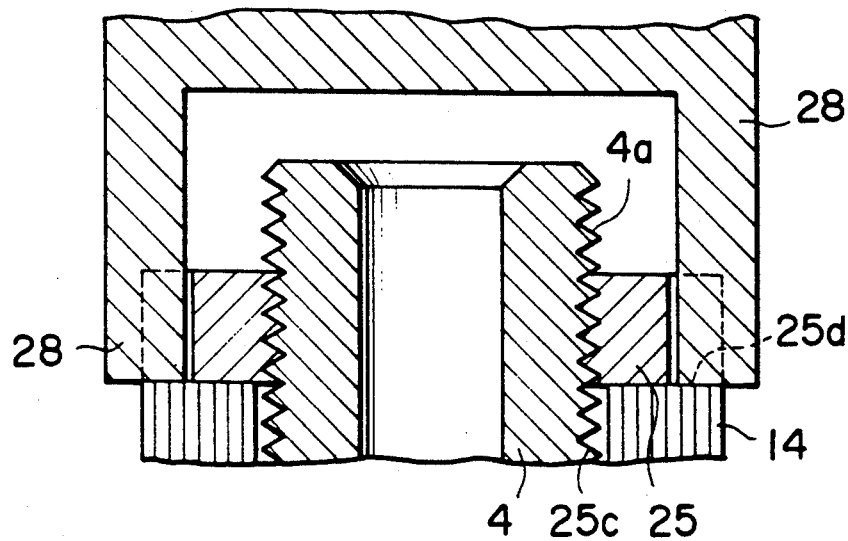

ACCELERATION DETECTOR

BACKGROUND OF THE INVENTION

1. Field of the Invention

This invention relates to an acceleration detector and more particularly to an acceleration detector for detecting knocking in an internal combustion engine.

2. Description of the Related Art

FIGS. 1 and 2 illustrate one example of an acceleration detector to which the present invention can be applied. The acceleration detector comprises a housing 1 defining an annular cavity 2 therein and an annular acceleration transducer assembly 3 disposed within the cavity 2. The housing 1 comprises a tubular, electrically conductive metallic bushing 4 having a through hole 5 and a flange 6. The housing 1 also comprises a ring-shaped resinous outer case 7 bonded by a bonding agent 7a to the flange 6 of the bushing 4 so that the cavity 2 is defined therein.

The outer case 7 also has a connector 8 radially outwardly extending from the outer case 7 so that an external output terminal 9 can extend through the connector 8 for taking out an output signal from the acceleration transducer assembly 3 disposed within the cavity 2. The acceleration transducer assembly 3 further includes an annular piezoelectric element 11 placed on the terminal plate 10, a washer-shaped output terminal 12 including a lead 12a connected to the external output terminal 9, an electrically insulating washer 13 disposed on the output terminal 12, an annular inertial weight 14 placed on the insulating washer 13 and a threaded ring-shaped stop nut 15 thread-engaged with the thread 4a on the tubular bushing 4.

As illustrated in FIG. 3, the output terminal 12 is made of a relatively thin metallic sheet and has a substantially ring-shaped portion 12b, a connection tab 12c substantially radially outwardly extending from the ring-shaped portion 12b and the lead 12a for an external connection. An electrically insulating tape or tube 16 is placed on the tubular bushing 4 so that the acceleration transducer assembly 3 is insulated from the bushing 4 even when the output terminal 12 as well as the piezoelectric element 11 are eccentrically assembled.

As seen from FIGS. 4 to 7 inclusive, the ring-shaped stop nut 15 has an internal thread 15a in the inner circumferential surface thereof and a pair engagement grooves 15b formed in one of planar end surfaces 15c for receiving a tool 18 therein for rotating the stop nut 15 about the bushing 4 for thread engaging the stop nut 15 on the thread 4a of the bushing 4 as illustrated in FIG. 7. It is seen that the engagement grooves 15b are radially extending from the inner circumference to the outer circumference passing through the internal thread 15a of the stop nut 15.

In order to resiliently support and protect the acceleration transducer assembly 3 within the cavity 2 from undesirable environmental conditions, the remaining space of the cavity 2 of the housing 1 which is not occupied by the acceleration transducer assembly 3 is substantially filled with a resilient filler material 17 of a thermo-setting resin. The filler material 17 must be sufficiently resilient after it is cured to allow the movement of the inertial weight 14 relative to the housing 1 when an acceleration is applied to the inertial weight 14 so that the piezoelectric element 11 generates a voltage signal proportional to the pressure exerted on it by the relative movement of the inertial weight 14 against the piezoelectric element 11.

When in use, the acceleration detector is securely mounted on the internal combustion engine (not shown) by a suitable bolt (not shown) inserted into the central through hole 5 of the housing 1. The acceleration or the vibration of the internal combustion engine produces the movement of the inertial weight 14 relative to the housing 1, which causes the piezoelectric element 11 to be stressed by the inertial weight 14, whereby an electrical signal indicative of the movement of the inertial weight 14 relative to the engine is generated from the piezoelectric element 11. The electrical signal is provided from the output terminal 9 to be analyzed to determine as to whether or not a knocking signal which generates upon knocking of the internal combustion engine is involved. When it is determined that a knocking signal is contained in the electrical signal, the operating parameters for operating the engine can be adjusted to increase the output power or decrease the fuel consumption rate.

In the conventional acceleration detector as above described, since the engagement grooves 15b are formed in the planar end surface 15c of the stop nut 15 and extend through the internal thread 15a, burrs occur in the region at which the thread 15a and the engagement grooves 15b intersect. Such burrs interfere with the thread engagement between the stop nut 15 and the bushing 4, impeding an easy assembly of the acceleration transducer 3. If these burrs are to be removed, the internal thread 15a of the stop nut 15 must be additionally finished, increasing the number of manufacturing steps and cost.

Also, during the assembly of the acceleration detector, the tightening tool 18 is brought into engagement with the engagement grooves 15b and is rotated about its axis to tighten the stop nut 15 on the bushing 4 to securely hold the acceleration transducer 3. During this operation, the tightening tool 18 is often moved transversely back and forth as shown by an arrow 19 in FIG. 7 in order to properly insert the tool 18 into the engagement grooves 15b. This often causes the thread 4a on the bushing 4 to be damaged or destroyed by the tightening tool 18, which makes the tightening of the stop nut 15 on the bushing 4 difficult during the re-assembly of the detector.

Also, in the conventional acceleration detector as above described, during the tightening of the stop nut 15 on the bushing 4 to securely hold the acceleration transducer 3 in the detector housing 1, the output terminal 12 is also rotated due to the friction between the components in the acceleration transducer 3. This causes dislocation of the upwardly extending lead 12a relative to the external output terminal 9 to which the lead 12a must be connected. When the lead 12a is mechanically held in position by a suitable means such as when the external output terminal 9 and the lead 12a are connected, for example, the rotation of the ring portion 12b of the output terminal 12 causes a concentration of stress on transition areas A between the ring portion 12b and the connecting tab 12c, which may cause breakage at the transition area A.

SUMMARY OF THE INVENTION

Accordingly, one object of the present invention is to provide an acceleration detector free from the above discussed problems of the conventional acceleration detector.

Another object of the present invention is to provide an acceleration detector in which the internal thread of the stop nut is not damaged.

Another object of the present invention is to provide an acceleration detector in which the engagement grooves of the stop nut for receiving a tightening tool do not intersect the internal thread.

A further object of the present invention is to provide an acceleration detector in which the breakage of the output terminal during the tightening rotation of the stop nut can be prevented.

Still another object of the present invention is to provide an acceleration detector that can be relatively easily assembled.

A further object of the present invention is to provide an acceleration detector in which the stress concentration on the output terminal of the transducer assembly due to the tightening rotation of the stop nut is prevented.

With the above objects in view, the acceleration detector of the present invention comprises a threaded bushing, an acceleration transducer assembly disposed on the bushing and including a piezoelectric element, an output terminal and an inertial weight, and a substantially ring-shaped, thread-engaging stop nut thread-engaging to the threaded bushing for securing the transducer assembly thereon. In one embodiment of the invention, the stop nut may have an internal thread in the inner circumferential surface thereof and a pair of axially-extending engagement grooves formed in an outer circumferential surface thereof for receiving a tool therein for rotating the stop nut about the bushing. In another embodiment of the invention, the output terminal may have a substantially ring-shaped portion, a connection tab substantially radially outwardly extending from the ring-shaped portion for an external connection, and a transition fillet provided at a transition area between the ring-shaped portion and the tab for moderating the concentration of stress on the transition area. The above stop nut and the output terminal may be used together.

BRIEF DESCRIPTION OF THE DRAWINGS

The present invention will become more readily apparent from the following detailed description of the preferred embodiments of the present invention taken in conjunction with the accompanying drawings, in which:

FIG. 15 is a diagram illustrating how the tightening tool engages the engagement grooves in the stop nut in the acceleration detector of the present invention.

DESCRIPTION OF THE PREFERRED EMBODIMENTS

Figure 1:
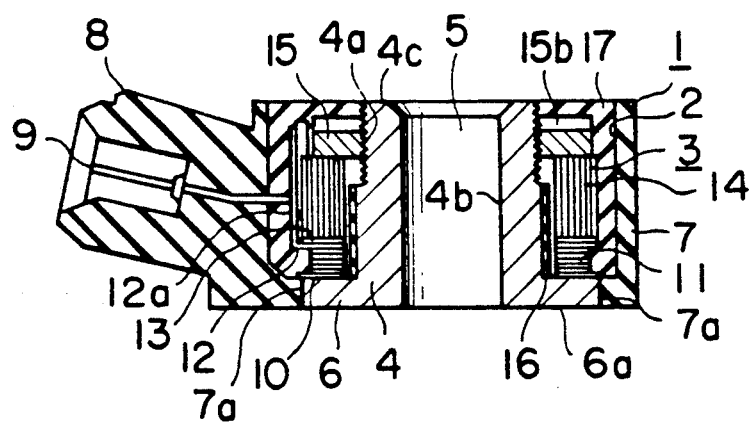
FIG. 1 is a sectional side view showing one example of a conventional acceleration detector.
Figure 2:
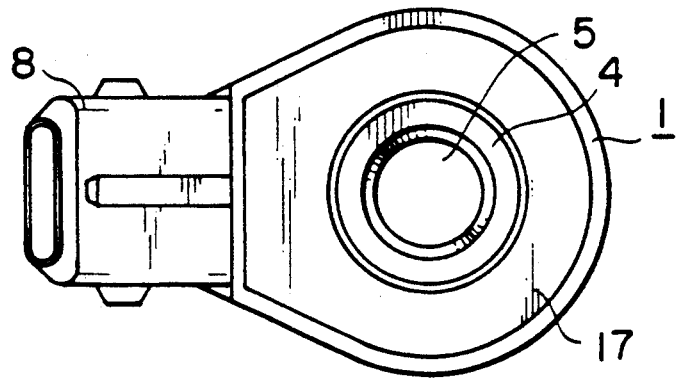
FIG. 2 is a plan view of the acceleration detector shown in FIG. 1.
Figure 3:
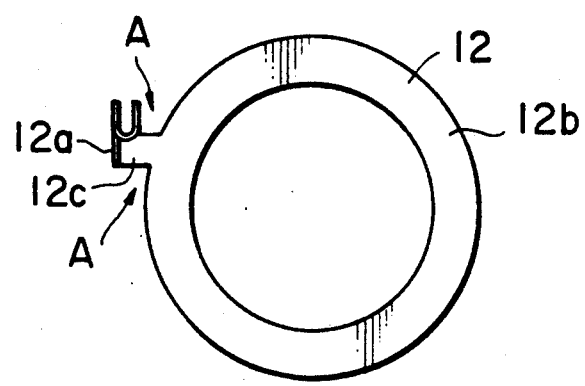
FIG. 3 is a plan view of the output terminal employed in the acceleration transducer of the acceleration detector of the conventional design.
Figure 4:
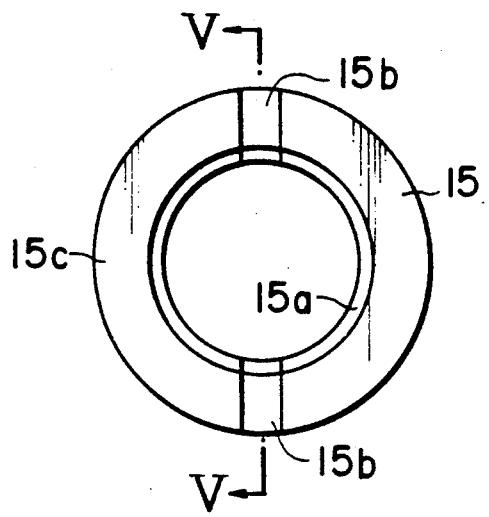
FIG. 4 is a plan view showing the stop nut of the acceleration transducer of the acceleration detector of the conventional design.
Figure 5:
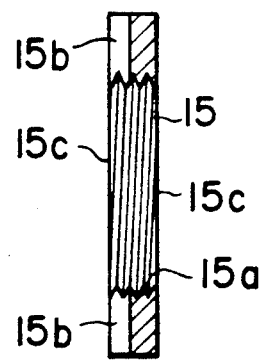
FIG. 5 is a sectional side view taken along the line V—V of FIG. 4.
Figure 8:
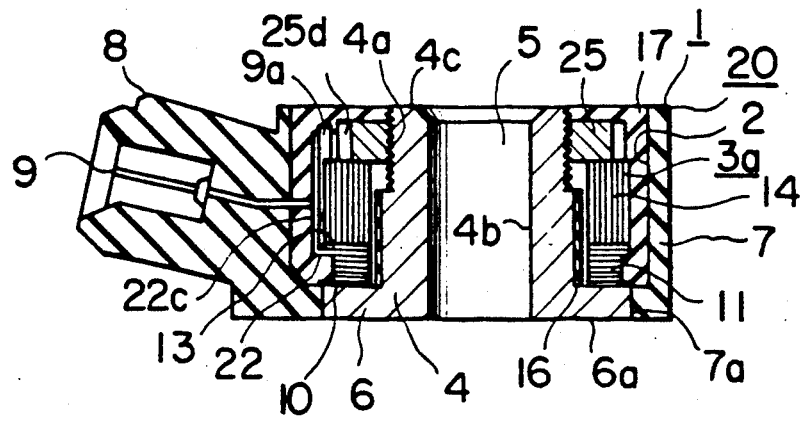
FIG. 8 is a sectional side view illustrating the acceleration detector of the present invention.

The acceleration detector 20 of the present invention is illustrated in FIG. 8 and has a basic structure similar to that described and illustrated in conjunction with FIG. 1. More particularly, the acceleration detector 20 comprises a housing 1 defining an annular cavity 2 therein and an annular acceleration transducer assembly 3a disposed within the cavity 2. The housing 1 comprises a tubular, electrically conductive metallic bushing 4 having a through hole 5 and a flange 6. The housing 1 also comprises a ring-shaped resinous outer case 7 bonded by a bonding agent 7a to the flange 6 of the bushing 4 so that the cavity 2 is defined therein.

The outer case 7 also has a connector 8 radially outwardly extending from the outer case 7 so that an external output terminal 9 having an upwardly extended inner end 9a can extend through the connector 8 for taking out an output signal from the acceleration transducer assembly 3a disposed within the cavity 2. The acceleration transducer assembly 3a includes a terminal plate 10 disposed on the flange 6 of the bushing 4, an annular piezoelectric element 11 placed on the terminal plate 10 and a washer-shaped output terminal 22.

Figure 9:
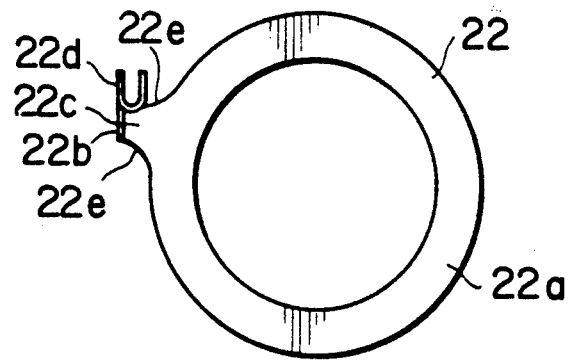
FIG. 9 is a plan view of the output terminal employed in the acceleration transducer of the acceleration detector of the present invention.
Figure 10:
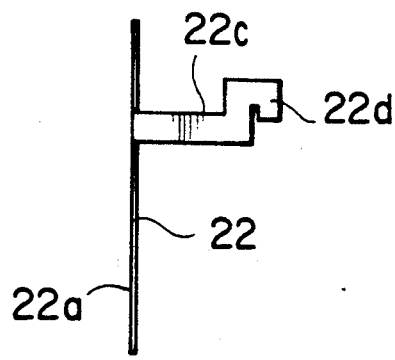
FIG. 10 is a side view of the output terminal illustrated in FIG. 9.
Figure 11:
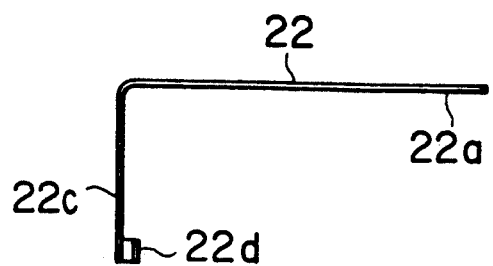
FIG. 11 is a front view of the output terminal illustrated in FIG. 9.
Figure 12:
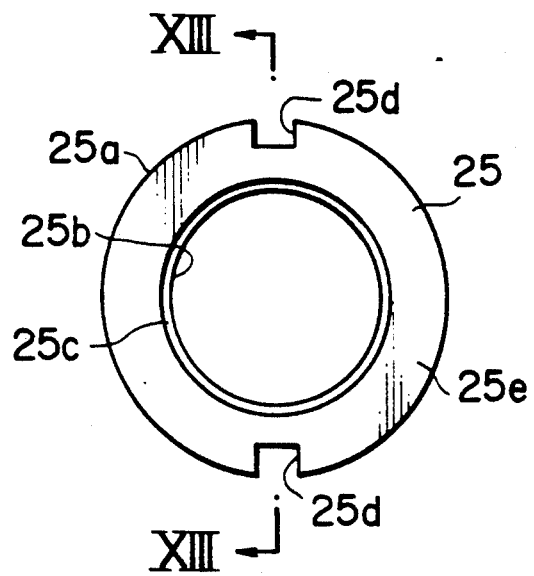
FIG. 12 is a plan view showing the stop nut of the acceleration transducer of the acceleration detector of the present invention.
Figure 13:
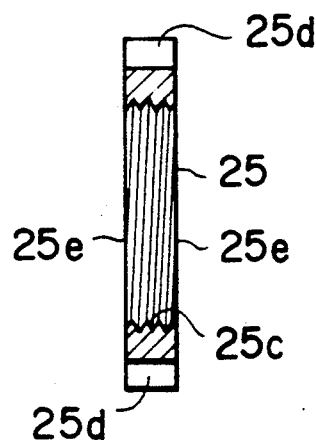
FIG. 13 is a sectional side view taken along the line XIII—XIII of FIG. 12.
Figure 14:
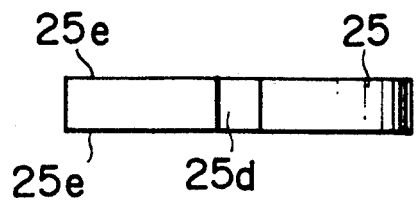
FIG. 14 is a front view of the stop nut illustrated in FIG. 12.

As best seen from FIGS. 9 to 11, the output terminal 22 is an integral electrically conductive member made of a relatively thin sheet material. The output terminal 22 comprises a ring-shaped main portion 22a, a connecting tab 22b substantially radially extending from the outer periphery of the main portion 22a, a lead 22c extending perpendicularly from the connecting tab 22b and including at its end an engagement hook 22d adapted to be connected to an upper end of the inner end 9a of the external output terminal 9. According to the present invention, the output terminal 22 further comprises transition fillets 22e provided at each transition area between the ring-shaped main portion 22a and the connecting tab 22b for moderating the concentration of stress on the transition areas of the output terminal 22.

Returning to FIG. 8, the acceleration transducer assembly 3a also comprises an electrically insulating washer 13 disposed on the output terminal 22, an annular inertial weight 14 placed on the insulating washer 13 and a threaded ring-shaped stop nut 2 thread-engaged with the thread 4a on the tubular bushing 4. An electrically insulating tape or tube 16 is placed on the tubular bushing 4 so that the acceleration transducer assembly 3a is insulated from the bushing 4 even when the output terminal 12 as well as the piezoelectric element 11 are eccentrically assembled.

As illustrated in FIGS. 12 to 15, according to the present invention, the stop nut 25 a substantially annular member having a rectangular cross-section having an outer circumferential surface 25a and an inner circumferential surface 25b in which an internal thread 25c is formed and a pair of axial engagement grooves 25d formed in the outer circumferential surface 25a for receiving a tool 28 therein for rotating the stop nut 25 about the bushing 4 as illustrated in FIG. 15. The engagement grooves 25d axially extend through the stop nut 25 between planer end surfaces 25e of the stop nut 25, and the engagement grooves 25d each having a substantially U-shaped cross section, so that the tightening tool 28 may engage the engagement grooves 25d without interferring with and damaging the thread 4a of the bushing 4 as understood from FIG. 15.

In order to resiliently support and protect the acceleration transducer assembly 3a within the cavity 2 from undesirable environmental conditions, the remaining space of the cavity 2 of the housing 1 which is not occupied by the acceleration transducer assembly 3a is substantially filled with a resilient filler material 17 of a thermo-setting resin. The filler material 17 must be sufficiently resilient after it is cured to allow the movement of the inertial weight 14 relative to the housing 1 when an acceleration is applied to the inertial weight 14 so that the piezoelectric element 11 generates a voltage signal proportional to the pressure exerted on it by the relative movement of the inertial weight 14 against the piezoelectric element 11.

According to the acceleration detector 20 of the present invention, since the engagement grooves 25d are formed to extend from one planar end surface 25e to the other planar end surface 25e of the stop nut 25 at the outer circumferential surface 25a, the engagement grooves 25d do not intersect with the internal thread 25c, no burrings occur even when the engagement grooves 25d are machined in the threaded stop nut 25. Therefore, burrs which are formed in the conventional design cannot impede the thread engagement between the stop nut 25 and the bushing 4, enabling an easy assembly of the acceleration transducer 3a.

Figure 6:
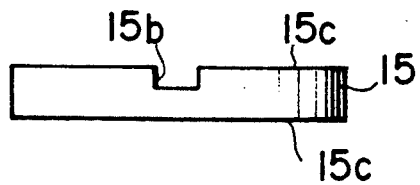
FIG. 6 is a front view of the stop nut illustrated in FIG. 4.
Figure 7:
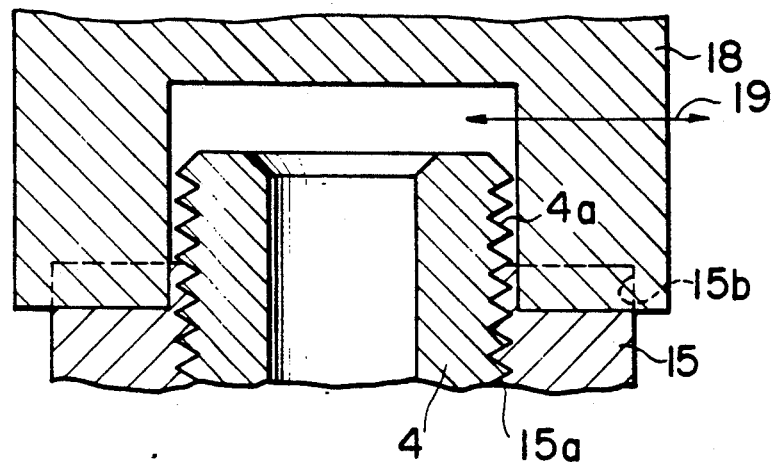
FIG. 7 is a diagram illustrating how the tightening tool engages the engagement grooves in the stop nut in the acceleration detector of the conventional design.

Also, when the tightening tool 28 is to be brought into engagement with the engagement grooves 25d for tightening rotation of the stop nut 25 on the bushing 4 to securely hold the acceleration transducer 3a, there is no need for the tightening tool 28 to be moved transversely back and forth as shown by the arrow 19 in FIG. 6 in order to properly insert the tool 18 into the engagement grooves 15b. Therefore, there is no fear that the thread 4a on the bushing 4 be damaged or destroyed by the tightening tool 28.

Also, according to the acceleration detector of the present invention, even when the output terminal 22 is pulled during the tightening of the stop nut 25 on the bushing 4 to securely hold the acceleration transducer 3a in the detector housing 1, and the lead 22c is mechanically held in position by a suitable means such as by the hook 22d engaging the upper end 9a of the external output terminal 9, for example, a tensile stress generated at the transition area between the ring portion 22a and the connecting tab 22b due to the rotation of the ring portion 22a is moderated or distributed by the curved edges or the moderating fillets 22e between the ring portion 22a and the connecting tab 22b.

What is claimed is:

1. An acceleration detector, comprising:
   a threaded bushing;
   an acceleration transducer assembly disposed on said bushing and including a piezoelectric element, an output terminal and an inertial weight; and
   a substantially ring-shaped, thread-engaging stop nut thread-engaging to said threaded bushing for securing said transducer assembly thereon;
   said stop nut having an internal thread in the inner circumferential surface thereof and an axial engagement groove extending through said stop nut and formed in an outer circumferential surface thereof for receiving a tool therein for rotating said stop nut about said threaded bushing;
   said output terminal having a substantially ring-shaped portion, a connection tab substantially radially outwardly extending from said ring-shaped portion for an external connection, and a transition fillet provided at a transition area between said ring-shaped portion and said tab for distributing the concentration of stress on said transition area during tightening of said stop nut.

2. An acceleration detector as claimed in claim 1, wherein said engagement groove does not contact said internal thread of said inner circumferential surface, and wherein the tool used for rotating said stop nut is prevented from contacting said threaded bushing.

3. An acceleration detector as claimed in claim 1, wherein said engagement groove comprises a pair of axial grooves extending through said stop nut disposed at equal circumferential intervals.

4. An acceleration detector as claimed in claim 1, wherein said engagement groove comprises a pair of axial grooves extending through said stop nut disposed at equal circumferential intervals, said axial grooves each having a substantially U-shaped cross section.

5. An acceleration detector as claimed in claim 1, wherein said tab has integrally formed thereon an electrically conductive riser extension.

6. An acceleration detector as claimed in claim 1,
   wherein said output terminal connects to an external output terminal, and
   wherein said tab includes a hook for engaging an inner end of said external output terminal.

7. An acceleration detector as claimed in claim 1,
   wherein said output terminal connects to an external output terminal, and
   wherein said output terminal further includes a lead extending perpendicularly from said tab, said lead having an engagement hook at an end of said lead for engaging an inner end of said external output terminal.

* * * * *